No. 672,092. Patented Apr. 16, 1901.
E. J. CANTWELL.
HAY STACKER.
(Application filed Jan. 11, 1901.)
(No Model.) 3 Sheets—Sheet 1.
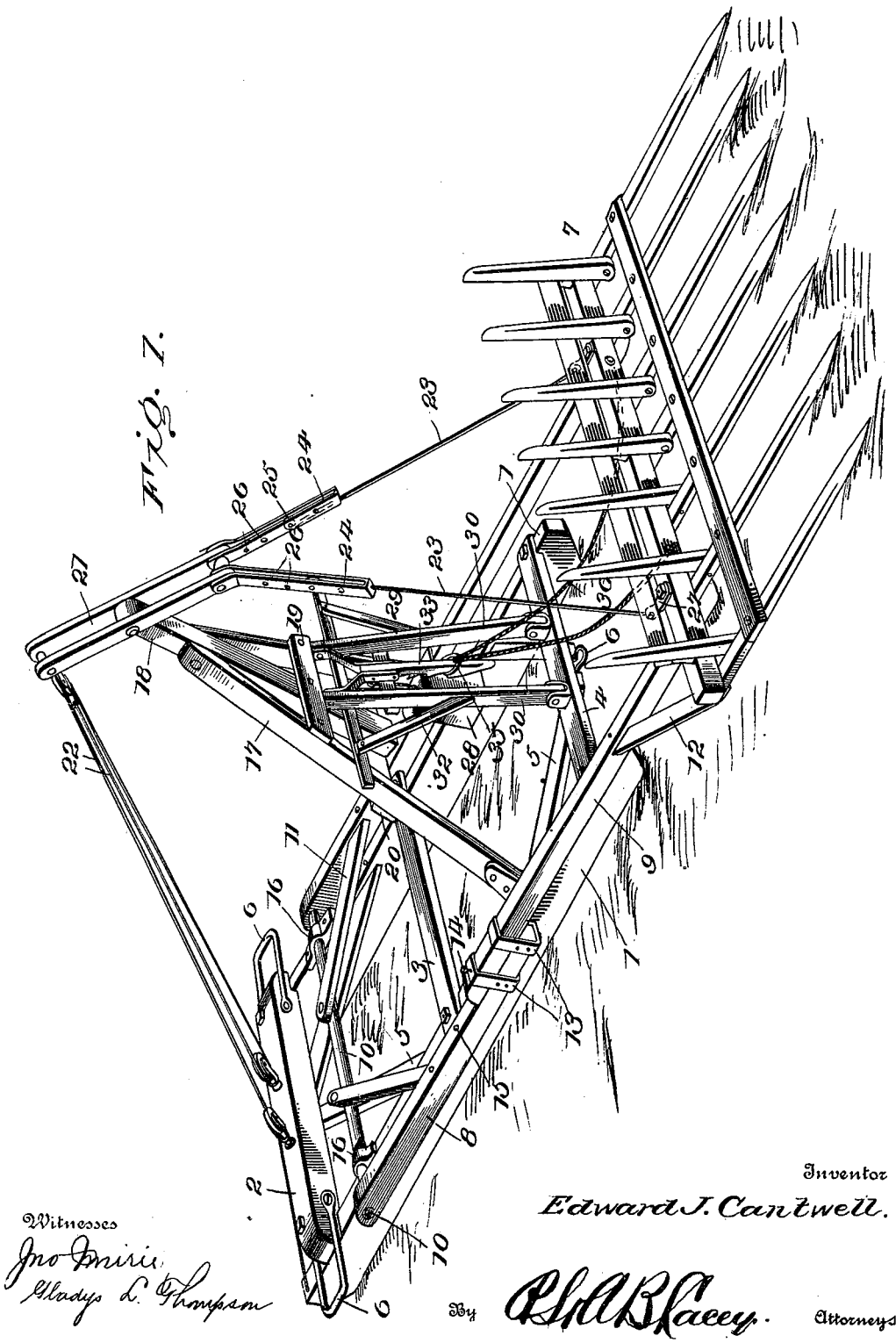
Witnesses
Jno Smirie
Gladys L. Thompson
Inventor
Edward J. Cantwell.
By R. S. & A. B. Lacey. Attorneys

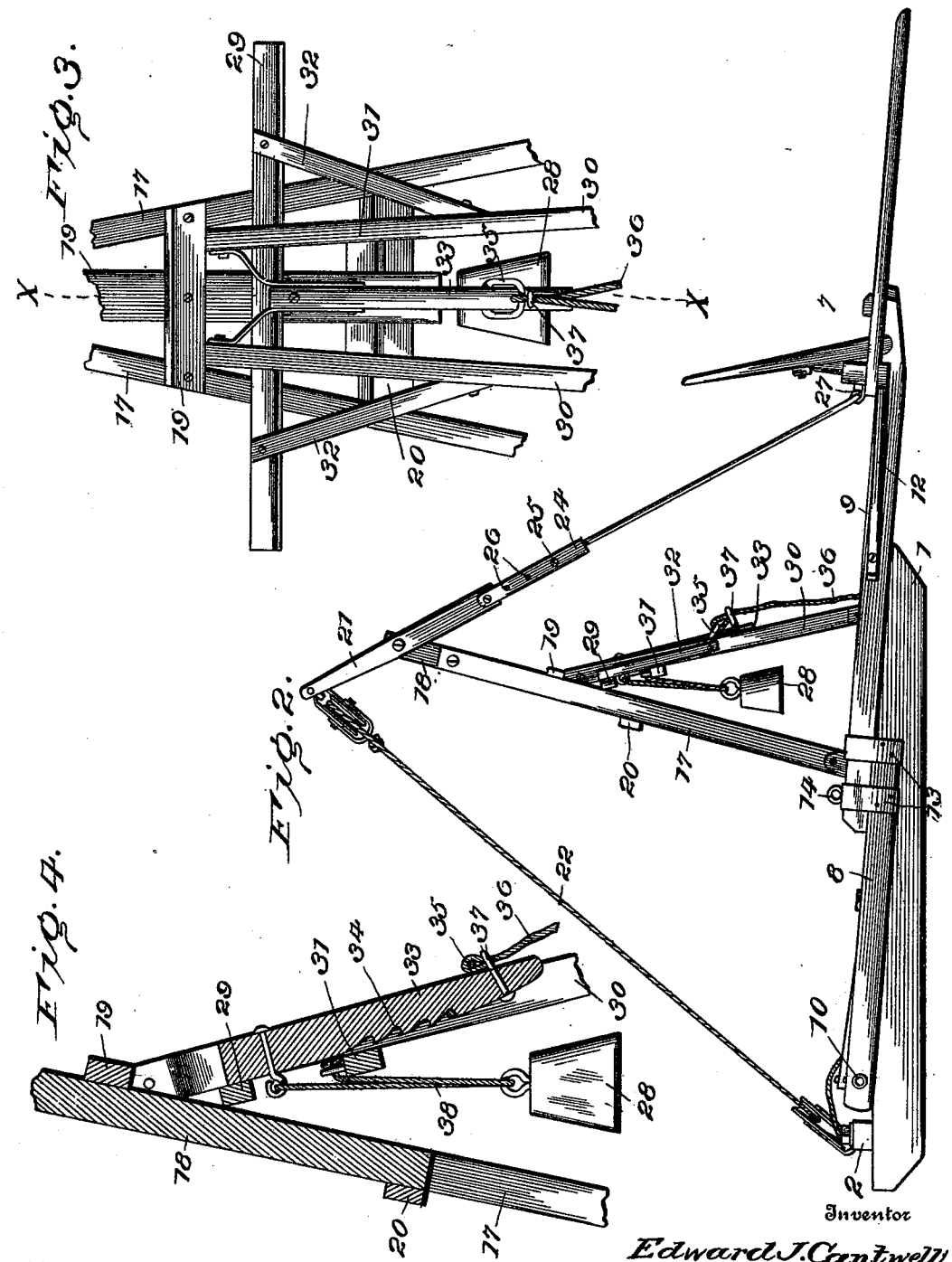

No. 672,092. Patented Apr. 16, 1901.
E. J. CANTWELL.
HAY STACKER.
(Application filed Jan. 11, 1901.)
(No Model.) 3 Sheets—Sheet 3.
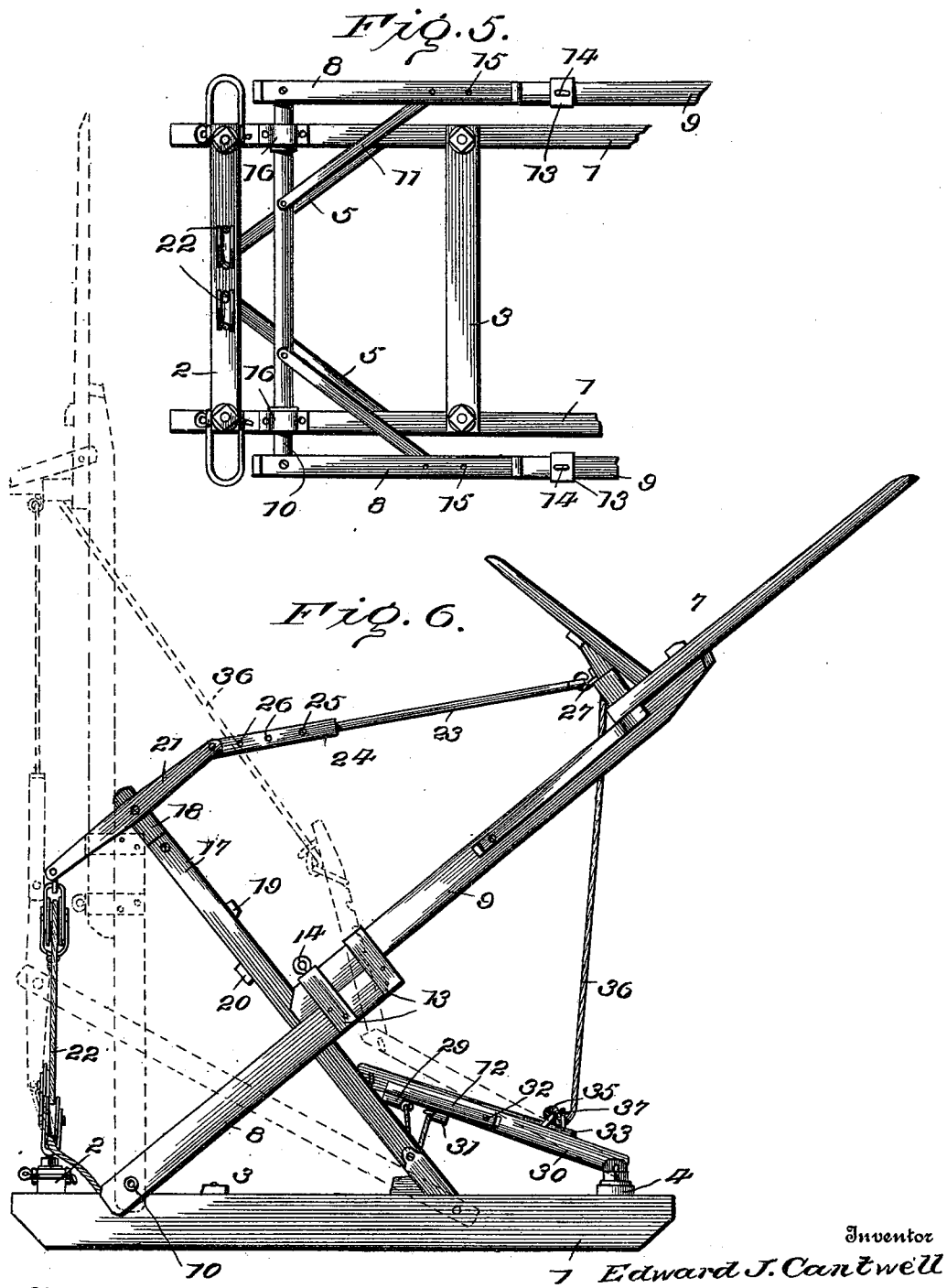

UNITED STATES PATENT OFFICE.

EDWARD J. CANTWELL, OF NEW BOSTON, MISSOURI.

HAY-STACKER.

SPECIFICATION forming part of Letters Patent No. 672,092, dated April 16, 1901.

Application filed January 11, 1901. Serial No. 42,918. (No model.)

*To all whom it may concern:*

Be it known that I, EDWARD J. CANTWELL, a citizen of the United States, residing at New Boston, in the county of Linn and State of Missouri, have invented certain new and useful Improvements in Hay-Stackers; and I do hereby declare the following to be a full, clear, and exact description of the invention, such as will enable others skilled in the art to which it appertains to make and use the same.

This invention relates to hay-stackers, and has for its primary object to increase the life and usefulness of this class of machines by simplifying and improving the general construction and disposing the parts to assure stability.

The invention also aims to prevent a too-rapid movement of the fork when returning to a normal position after depositing a shock or bunch of hay upon the stack, thereby preventing the jar and strain incident to a sudden stop of the fork when moving rapidly, as is the case with devices of this kind as generally constructed.

The invention further aims to provide a machine of the nature aforesaid easy of operation, braced to resist strain in every direction, free from shock such as usually experienced when operating stackers as commonly constructed, and effective and satisfactory in result.

Further objects and advantages are contemplated and will be manifest as the nature of the invention is unfolded and comprehended, and to this end reference is to be had to the following description and the drawings hereto annexed, in which—

Figure 1 is a perspective view of a hay-stacker constructed in accordance with and embodying the essential features of the invention. Fig. 2 is a side elevation showing the fork in its normal position and adapted to receive the shock or bunch of hay to be deposited upon the stack. Fig. 3 is a detail view of the combined weight and brake frame pivoted to the runner-frame and showing a portion of the pivoted derrick. Fig. 4 is a vertical section on the line X X of Fig. 3. Fig. 5 is a plan view of the rear end portion of the runner-frame and the corresponding part of the fork-frame. Fig. 6 is a side elevation of the stacker, the fork being shown in full lines about midway of its extreme movements and the dotted lines showing the fork elevated and the relative disposition of the parts resultant therefrom.

Corresponding and like parts are referred to in the following description and indicated in all the views of the drawings by the same reference characters.

The runner-frame comprises longitudinal runners 1, transverse beams 2, 3, and 4, and braces 5. Clevises 6 are applied to the beams 2 and 4 to receive pegs, by means of which the runner-frame is anchored when properly located.

The fork 7, of ordinary construction, is attached to the outer or free end of the fork-frame, which is pivoted at its inner or rear end to the rear portion of the runner-frame. The fork-frame consists of extensible arms composed of bars 8 and 9 and a tie-rod 10 and braces 11 and 12, the braces 11 being interposed between the tie-rod 10 and the bars 8, and the braces 12 connecting the outer ends of the bars 9 with the ends of the fork-head. The end portions of the bars 8 and 9 overlap and are slidable one upon the other to increase or diminish the length of the fork-frame according to the height of the stack and the desired lift of the shock or bunch of hay to be deposited thereon. Cuffs 13 are spaced apart and secured to the outer ends of the bars 8 and receive the inner ends of the bars 9, and pins 14 secure the bars 9 in the adjusted position by passing through openings in the inner ends of said bars and one of a series of openings 15 in the bars 8. The tie-rod 10 is preferably a length of pipe or tubing and is secured in any substantial manner at its ends to the bars 8 and is journaled in bearings 16, applied to the rear end portion of the runner 1. It will thus be seen that the part 10 serves in the dual capacity of a transverse stay for the fork-frame and an axis for said frame to turn upon when the stacker is in operation.

The derrick consists of bars 17, pivoted at their lower ends to the runners 1 and inclining upwardly, a post 18, secured between the converging ends of the bars 17, and transverse pieces 19 and 20, connecting the bars 17 and posts 18. A boom 21 is fulcrumed about midway of its ends to the outer end of the post 18, and a block and tackle 22 connects one end of the boom 21 with the transverse or cross timber 2 at the rear end of the runner-frame. Divergent stays connect the opposite end of the boom 21 with opposite end portions of the fork and consist of rods 23 and loops 24, the latter being pivoted to corresponding bars or members of the boom 21 and having their outer closed ends pierced for the passage therethrough of the rods 23, said rods making adjustable connection with the loops 24, so as to support the fork at the required distance above the ground. The outer ends of the rods 23 are bent to provide eyes 25, which receive pins passed through one of a series of openings 26 in the side members of the loops 24. The lower ends of the rods 23 may be secured to the fork in any desired manner and, as shown, are hooked and engaged with plates 27, bolted or otherwise attached to the head of the fork. The cross-piece 19 in addition to serving as a tie for the parts 17 and 18 provides a stop to limit the downward movement of the fork when in a normal position. This function will appear more fully hereinafter.

The pivoted frame, having the counterbalancing-weight 28 attached thereto and provided with the brake-beam 29 and serving to limit the movements of the fork, consists of bars 30, pivoted at their lower ends to the transverse beam 4 at the front end of the runner-frame. These bars 30 are connected near their upper or free ends by the brake-beam 29 and a cross-piece 31, and the outer ends of the brake-beam are stayed by braces 32, interposed between said ends and the bars 30. The bars 30 are of a length to engage at their upper ends with the cross-piece 19 and limit the downward movement of the fork 7 when in the desired position. The brake-beam 29 is adapted to engage frictionally with the front side of the bars 17 of the derrick and retard the movement of the fork when returning to position after depositing the shock or bunch of hay upon the stack. The bars 30 normally incline toward the derrick when the latter and the fork 7 are in position for a load to be deposited upon the fork. Hence the weight 28 serves to assist in lifting the load by causing the bars 30 to exert a pressure against the bars 17. In like manner the weight 28 serves to hold the brake-beam 29 against the bars 17, so as to retard the movement of the fork when returning to a normal position after depositing the load upon the stack. An arm 33 is pivoted to the upper ends of the bars 30 and is adapted to swing downward into the space formed therebetween, so as to lie in the plane of the bars 30, and is formed in its length with a series of notches 34, which coöperate with a link 35, attached to a rope or cord 36, so as to limit the forward movement of the fork and derrick. This is shown most clearly by the dotted lines in Fig. 6. The rope or cord 36 is attached at its ends to the end portions of the fork-head, and the link 35 is supported in the bight formed by doubling the middle portion of the said rope or cord after being passed through a guide-eye 37, applied to the free end of the pivoted arm 33. The weight 28 is suspended in the bight of a rope or cord 38, having one end attached to the cross-piece 31 and its other end connected to the pivoted arm 33. The end portion of the rope 38 attached to the pivoted arm 33 is adapted to run over the brake-beam 29 when said arm 33 is extended. The weight 28 serves to hold the arm 33 and to return the pivoted frame and the fork to a normal position and to hold the brake-beam against the derrick, so as to prevent a too-rapid movement of the fork when returning to a normal position after being actuated.

Having thus described the invention, what is claimed as new is—

1. In a hay-stacker, the combination with the runner or base frame, the fork and actuating means therefor, of a pivoted derrick, connections between said derrick and fork, a frame having pivotal connection with the base-frame and normally inclined from the perpendicular and serving to hold the derrick and fork in a given position, a counterbalance attached to said pivoted frame, and a brake-beam applied to the pivoted frame and adapted to coöperate with the derrick to retard and prevent the too-rapid movement of the fork when returning to a normal position, substantially as set forth.

2. In a hay-stacker, the combination with the runner or base frame, a fork pivoted thereto, and actuating means for the fork, of a derrick pivoted to the frame and normally inclined from the perpendicular toward the fork, connections between the derrick and fork, a frame pivoted to the runner-frame and inclining in an opposite direction to the derrick and forming a support therefor to hold it and the fork in a given position, a brake-beam attached to the pivoted frame to coöperate with the derrick to retard the movement of the fork when returning to a normal position, connections between the pivoted frame and fork including a pivoted arm, and a weight applied to the pivoted frame and adapted to fold said pivoted arm to return the fork to a normal position, to hold the brake-beam against the derrick and to assist in lifting the load, substantially as set forth.

3. In a hay-stacker, and in combination with the runner or base frame, the fork and actuating means for the fork, a derrick composed of upwardly-inclined bars pivoted at their lower ends to the runner-frame, connections between the derrick and fork, bars pivoted to the front end of the runner-frame and coöperating with the derrick to hold it and the fork in a given position, a brake-beam attached to the upper ends of the pivoted bars and adapted to bear against the derrick, an arm pivoted to the pivoted bars, a rope or cord adjustably interposed between the pivoted arm and the fork, a rope or cord having one end attached to the pivoted arm and its opposite end connected with the pivoted bars, and a weight suspended in the fold of said rope or cord and serving to set the brake-beam to hold the pivoted arm and return the parts to a normal position, substantially as set forth.

4. In a hay-stacker, a runner or base frame, a fork, a derrick having pivotal connection with the runner-frame, a boom pivoted midway of its ends to the upper end of the derrick, a block and tackle between one end of the boom and the rear end of the runner-frame, divergent connections between the opposite end of the boom and the end portions of the fork, the same consisting of rods and loops, the latter having a series of openings in their length, and the rods passing through openings in the closed ends of the loops and having adjustable connection therewith, and means for limiting the rearward movement of the fork and serving to return it to a normal position, substantially as set forth.

In testimony whereof I affix my signature in presence of two witnesses.

EDWARD J. CANTWELL. [L. S.]

Witnesses:
F. G. FORREST,
JOHN C. PARK.